US012780042B2

(12) United States Patent
Long et al.

(10) Patent No.: US 12,780,042 B2
(45) **Date of Patent: *Nov. 3, 2026**

(54) INTERNALLY COOLED ELECTRIC DRIVE AXLE FOR WORK VEHICLE

(71) Applicant: Deere & Company, Moline, IL (US)

(72) Inventors: Randall L Long, Coffeyville, KS (US); Briton T. Eastman, Coffeyville, KS (US)

(73) Assignee: DEERE & COMPANY, Moline, IL (US)

(*) Notice: Subject to any disclaimer, the term of this patent is extended or adjusted under 35 U.S.C. 154(b) by 241 days.

This patent is subject to a terminal disclaimer.

(21) Appl. No.: 18/337,660

(22) Filed: Jun. 20, 2023

(65) Prior Publication Data

US 2024/0424955 A1 Dec. 26, 2024

(51) Int. Cl.
*B60L 58/26* (2019.01)
*B60K 7/00* (2006.01)
(Continued)

(52) U.S. Cl.
CPC ............ *B60L 58/26* (2019.02); *B60K 7/0007* (2013.01); *B60K 11/02* (2013.01); *B60L 15/20* (2013.01);
(Continued)

(58) Field of Classification Search
CPC .......... B60L 58/26; B60L 53/00; B60L 50/60; B60L 50/51; B60L 15/20; B60L 2210/40;
(Continued)

(56) References Cited

U.S. PATENT DOCUMENTS 4,418,777 A * 12/1983 Stockton ............. F16H 57/0413 184/6.12
8,896,166 B2 * 11/2014 Hofkirchner .......... H02K 11/33 310/59
(Continued)

FOREIGN PATENT DOCUMENTS

BR 102024001883 A2 * 12/2024
BR 102024002060 A2 * 12/2024
(Continued)

OTHER PUBLICATIONS

Utility U.S. Appl. No. 17/654,128, filed Mar. 9, 2022 (38 pages).
(Continued)

*Primary Examiner* — James A Shriver, II
(74) *Attorney, Agent, or Firm* — KLINTWORTH & ROZENBLAT LLP

(57) ABSTRACT

An electric drive axle for a work vehicle has an axle housing configured to mount to the work vehicle chassis. The axle housing defines an interior cavity disposed between opposite ends defining openings. Wheel end units are secured at least partially within the axle housing, each wheel end unit defining a hub for engaging a ground-engaging member of the work vehicle through one of the openings. Each wheel end unit has drive components configured to rotate the hub of a wheel end unit. A battery pack and power controller are mounted within the axle housing between the wheel end units. The power controller is electrically coupled to the wheel end units and the battery pack to control power to the wheel end units. Plumbing lines within the axle housing convey a coolant from a housing inlet to the battery pack and the power controller and from the battery pack and the power controller to a housing outlet.

20 Claims, 9 Drawing Sheets

(51) Int. Cl.

| | |
|---|---|
| ***B60K 11/02*** | (2006.01) |
| ***B60L 15/20*** | (2006.01) |
| ***B60L 50/51*** | (2019.01) |
| ***B60L 50/60*** | (2019.01) |
| ***B60L 53/00*** | (2019.01) |

(52) U.S. Cl.
CPC ............... *B60L 50/51* (2019.02); *B60L 50/60* (2019.02); *B60L 53/00* (2019.02); *B60K 2007/0061* (2013.01); *B60L 2210/40* (2013.01)

(58) Field of Classification Search
CPC .................. B60K 7/0007; B60K 11/02; B60K 2007/0061
See application file for complete search history.

(56) References Cited

U.S. PATENT DOCUMENTS

| | | | | |
|---|---|---|---|---|
| 10,099,552 | B2 | 10/2018 | Long et al. | |
| 10,107,363 | B2 | 10/2018 | Fliearman et al. | |
| 10,207,580 | B2 * | 2/2019 | Long | F16H 3/663 |
| 10,214,101 | B2 * | 2/2019 | Fliearman | F16D 25/10 |
| 10,518,627 | B2 * | 12/2019 | Nagpal | B62D 21/11 |
| 11,117,457 | B2 * | 9/2021 | Matt | H02K 11/0094 |
| 11,707,981 | B2 * | 7/2023 | Gowrisankar | F16H 3/64<br>475/150 |
| 2010/0025131 | A1 | 2/2010 | Gloceri et al. | |
| 2013/0240273 | A1 | 9/2013 | Langer et al. | |
| 2014/0084679 | A1 | 3/2014 | Li et al. | |
| 2015/0000990 | A1 * | 1/2015 | Barbir | F16H 57/0471<br>475/160 |
| 2019/0176618 | A1 | 6/2019 | Bassis | |
| 2019/0293158 | A1 | 9/2019 | Brown | |
| 2020/0156500 | A1 * | 5/2020 | Huff | B60L 7/10 |
| 2023/0226885 | A1 | 7/2023 | Gopalan et al. | |
| 2025/0042241 | A1 | 2/2025 | Dong et al. | |

FOREIGN PATENT DOCUMENTS

| | | | | |
|---|---|---|---|---|
| BR | 102024002052 | A2 * | 2/2025 | |
| CN | 113147352 | A | 7/2021 | |
| DE | 102010043901 | A1 | 5/2012 | |
| DE | 102012112377 | A1 * | 6/2014 | H02K 9/19 |
| DE | 102012112377 | A2 | 6/2014 | |
| DE | 102019114828 | A1 | 12/2019 | |
| DE | 112019004983 | T5 | 6/2021 | |
| DE | 102024103215 | A1 * | 12/2024 | B60K 7/0007 |
| DE | 102024104259 | A1 * | 12/2024 | B60K 17/354 |
| DE | 102024104260 | A1 * | 12/2024 | B60L 58/26 |
| EP | 2258569 | A2 | 8/2010 | |
| EP | 2697089 | | 8/2018 | |
| EP | 3386788 | A1 | 10/2018 | |
| WO | WO-2018150010 | A1 * | 8/2018 | B60K 7/0007 |
| WO | WO-2022197642 | A1 * | 9/2022 | B60K 17/24 |
| WO | WO-2024022712 | A1 * | 2/2024 | B60B 35/12 |

OTHER PUBLICATIONS

German Search Report issued in application No. 102024103215.4 dated Nov. 6, 2025, 29 pages.

German Search Report issued in application No. 102024104259.1 dated Nov. 14, 2025, 29 pages.

Leistungselektronik [Power Electronics] in Wikipedia 25.04.2023 at URL: https://de.wikipedia.org/w/index.php?title=Leistungselektronik&oldid=233148104, 12 pages.

German Search Report issued in application No. 102024104260.5 dated Oct. 31, 2025, 30 pages.

Battery management system, retrieved from <URL: https://de.wikipedia.org/w/index.php?title=Batteriemanagementsystem&oldid=230697518, on Nov. 10, 2025, 12 pages.

Non-Final Office Action issued in U.S. Appl. No. 18/337,682 dated Jan. 12, 2026.

* cited by examiner

INTERNALLY COOLED ELECTRIC DRIVE AXLE FOR WORK VEHICLE

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure generally relates to work vehicles, and in particular to electric drives for work vehicles.

BACKGROUND OF THE DISCLOSURE

Work vehicles, such as those used in the agricultural, construction, forestry, and mining industries, typically require high torque drives to provide high tractive forces for traveling over off-road terrain and to power heavy-duty work implements. Large fuel-burning engines (e.g., diesel engines) are the conventional power plants for such heavy-duty work vehicles. Advancing technologies have integrated electric power trains in conjunction with or replacement of conventional engines into work vehicles. Such electrified work vehicles may have entirely revised platforms (e.g., chassis, etc.) for the layout of the work vehicle components and sub-systems.

SUMMARY OF THE DISCLOSURE

The present disclosure provides an electric drive axle for a work vehicle with internal cooling of drive components within the axle.

Specifically, the disclosure provides an electric drive axle for a work vehicle having a chassis supported off the ground by ground-engaging members. The electric drive axle includes an axle housing configured to mount to the chassis. The axle housing defines an interior cavity disposed between opposite ends defining openings, and the axle housing has an inlet and an outlet. Wheel end units are secured at least partially within the axle housing. Each wheel end unit defines a hub for engaging one of the ground-engaging members through one of the openings. Each wheel end unit has drive components, which, in some embodiments, may include an electric machine and a reduction gear set, configured to rotate the hub of each wheel end unit. A battery pack is mounted within the axle housing between the wheel end units. A power controller is mounted within the axle housing between the wheel end units. The power controller is electrically coupled to the wheel end units and the battery pack and is configured to control supply of power from the battery pack to the wheel end units. Plumbing lines within the axle housing are configured to convey a coolant from the inlet to the battery pack and the power controller and from the battery pack and the power controller to the outlet.

In certain embodiments, the electric drive axle has an inlet manifold positioned within the axle housing and coupled to the inlet and to the battery pack and the power controller. An outlet manifold is positioned within the axle housing and coupled to the outlet and to the battery pack and the power controller. A bypass channel is positioned within the axle housing and coupling the inlet manifold to the outlet manifold, and a bypass valve is configured to control flow through the bypass channel. The power controller is configured to change a state of the bypass valve to permit flow from the outlet manifold to the inlet manifold through the bypass channel in response to a temperature of the battery pack falling below a battery operating temperature threshold. The electric drive axle may further include a pump within the axle housing configured to induce flow through the bypass channel, in which case the power controller may be coupled to the pump and configured to activate the pump in response to the temperature of the battery pack falling below the battery operating temperature threshold. The power controller may also be configured to change the state of the bypass valve to prevent flow through the bypass channel and to deactivate the pump in response to the temperature of the battery pack rising above the battery operating temperature threshold.

In other embodiments, the electric drive axle has an inlet manifold positioned within the axle housing and coupled to the inlet and to the battery pack and the power controller. An outlet manifold is positioned within axle housing and coupled to the outlet and to the battery pack and the power controller. A first valve is positioned within the axle housing and configured to control flow from the inlet manifold to the battery pack. A second valve is positioned within the axle housing and configured to control flow from the inlet manifold to the power controller. The power controller is coupled to the first valve and the second valve and is further configured to control the first valve according to a temperature of the battery pack and to control the second valve according to a temperature of the power controller.

In other embodiments, the electric drive axle is configured such that the plumbing lines convey the coolant from the inlet to the wheel end units and from the wheel end units to the outlet. Each of the wheel end units defines an oil circulation path, and the plumbing lines are configured to exchange heat with the oil circulation path. For example, each of the wheel end units may include a housing defining a coolant channel, and the plumbing lines are coupled to the coolant channel.

In other embodiments, the electric drive axle includes a heat exchanger and a pump external to the axle housing and coupled to the inlet and the outlet of the axle housing. The pump is configured to induce flow of the coolant through the heat exchanger and the plumbing lines.

In other embodiments, the electric drive axle includes an inverter mounted within the axle housing. The power controller is configured to control conversion of direct current (DC) current from the battery pack to alternating current supplied to the wheel end units. The power controller may be coupled to a direct current (DC) bus interface and is configured to charge the battery pack using current received over the DC bus interface. A battery management system (BMS) may also be included within the axle housing for controlling charging and discharging of the battery pack. The power controller may be coupled to a data bus interface and further configured to control operation of the wheel end units according to driver controls received over the data bus interface.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
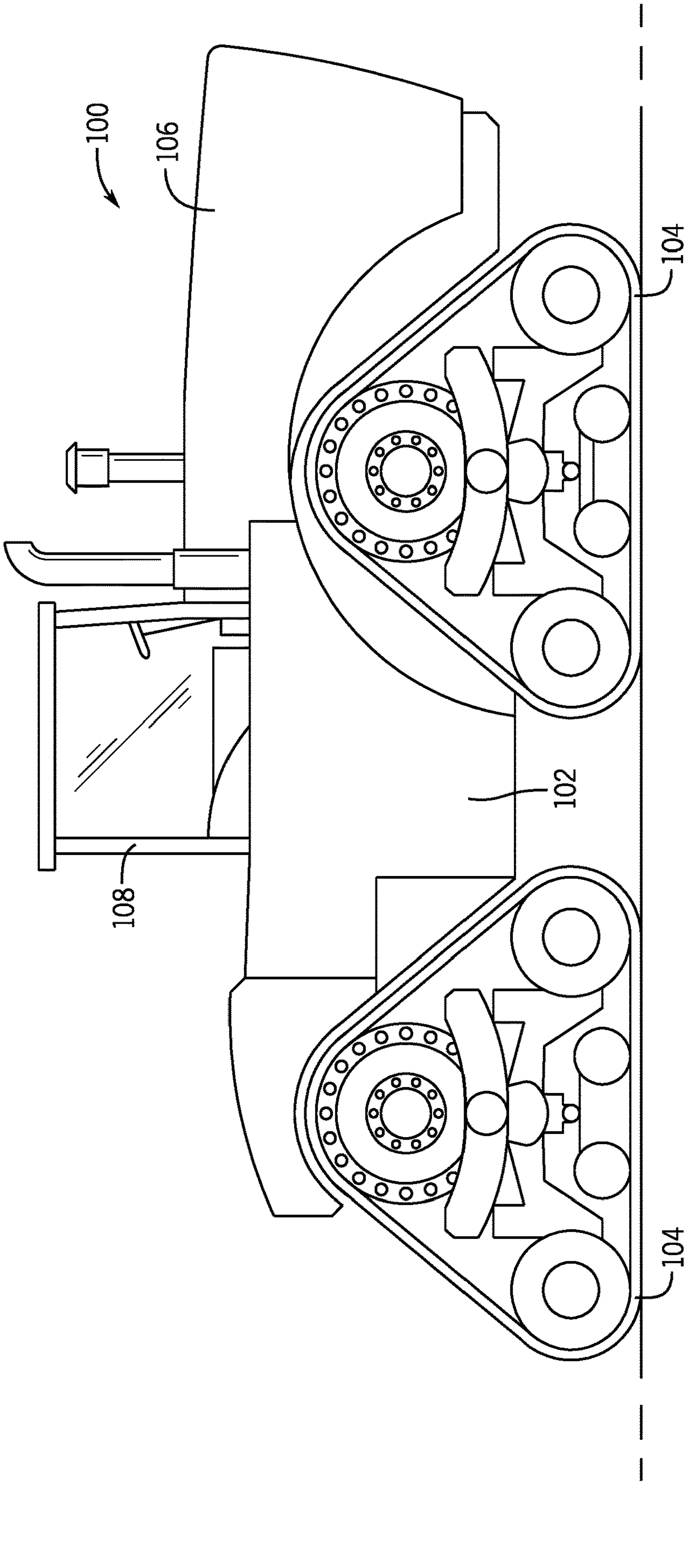
FIG. 1 is a side view of an example work vehicle incorporating the electric drive axle in accordance with the present disclosure.

The following describes one or more example embodiments of an electric drive axle and work vehicle, as shown in the accompanying figures of the drawings described briefly above. Various modifications to the example embodiments may be contemplated by one of skill in the art. The disclosed electric drive axle and work vehicle are applicable for use in or as vehicles used in agricultural, construction, forestry, mining operations and other types of work environments.

Overview

Large-scale work vehicles, such as those used in the agricultural, construction, forestry, and mining industries, require large power plants to power traction for travel over off-road terrain as well as to power work implements required to perform heavy-duty work operations. Conventionally, internal combustion engines, such as diesel engines, have been the primary power source for such work vehicles. To reduce emissions modern work vehicles are being electrified. This typically requires the vehicle platforms to be entirely redesigned to optimize the arrangement of vehicle subsystems on the chassis, which can be complex and expensive.

To address these issues, one aspect of this disclosure provides a self-contained electric drive axle includes wheel drives, with motors and reduction drives, battery packs, and power electronics that either: (a) will fit within the axle housing of existing vehicle platforms; or (b) will mount to vehicle chassis in place of existing axle assemblies. The electric drive axle may include structural components either in the form of discreet spacer type components that mount the internal components of the electric drive axle to the vehicle chassis directly or to an external axle housing otherwise connected to the chassis. In the latter case, the electric drive axle may include an interior housing that houses the internal components and fits within the external axle housing but does not provide structural support to the internal components. Alternatively, the electric drive axle may include a structural axle housing that serves to mount the electric drive axle to the vehicle chassis and provide structural support for the internal components. The term "structural" is to be understood herein to refer the axle housing or the chassis mounts having a composition of sufficient integrity to withstand and transmit forces sufficient to couple of the ground-engaging members of the work vehicle through the wheel drives within the electric drive axle to the vehicle chassis so that the ground-engaging members can support the vehicle chassis off the ground.

Another aspect of this disclosure is that vehicle components, such as the transmission and engine, may be replaced with components that interface with the electric drive axle, such as additional battery packs, brake choppers, traction control units, and/or generators. In this manner, a wide range of vehicle platforms may be converted to an electric power train by simply replacing one, two, or more axle housings and possibly installing other components in vacant spaces for components that have been eliminated. and/or a traction control unit. Electrical connection of these additional components may be provided by a robust DC bus system.

Another aspect of the disclosure is that the electric drive axle may be provided with internal components for cooling and heating or an interface to connect to an external onboard temperature management system. In various embodiments, the electric drive axle has a coolant circuit including an inlet, an outlet, and plumbing lines or channels within the axle housing configured to convey coolant from the inlet to the battery pack and the power controller and from the battery pack and the power controller to the outlet. An inlet manifold and an outlet manifold may be positioned within the axle housing and coupled to the respective inlet and outlet and to the battery pack and the power controller.

In some cases, a bypass line or channel may be positioned within the axle housing and coupling the inlet manifold to the outlet manifold. The electric drive axle may include one or more valves in the coolant circuit. For example, a bypass valve may control flow through the bypass line or channel. The power controller may be configured to change a state of the bypass valve in response to a prescribed temperature, temperature range, or temperature threshold. For example, the power controller may be configured to close the bypass valve to prevent flow from the outlet manifold to the inlet manifold when the battery pack falls below a prescribed battery operating temperature range. A pump may be included in the axle housing and configured to induce flow through the bypass line or channel. The power controller may be coupled to the pump and configured to activate the pump in response to the temperature of the battery pack falling below the battery operating temperature range. The power controller may also be configured to change a state of the bypass valve to prevent flow through the bypass channel and to deactivate the pump in response to the temperature of the battery pack rising above the battery operating temperature range.

In other embodiments the electric drive axle may include multiple valves position went within the axle housing to control flow from the inlet manifold to individual components within the axle housing. For example, the electric drive axle may include a first valve configured to control flow from the inlet manifold to the battery pack and a second valve configured to control flow from the inlet manifold to the power controller. The power controller may be coupled to the first valve and the second valve and configured to control the first valve according to a temperature of the battery pack and to control the second valve according to a temperature of the power controller.

In other embodiments, the coolant circuit may be configured to convey coolant from the inlet to the wheel end units and from the wheel end units to the outlet. Each of the wheel end units may define an oil circulation path configured to exchange heat with the cooling circuit. In some cases, the electric drive axle may include a heat exchanger external to the axle housing with the inlet and outlet coupled to the heat exchanger. A pump internal or external to the axle housing may be configured to induce flow of the coolant through the heat exchanger and the plumbing lines or channels within the electric drive axle housing.

Various other embodiments, one or more inverters may be mounted with the axle housing in which the power controller is configured to control conversion of direct current (DC) from the battery pack to alternating current (AC) supplied to the wheel end units. The power controller may be coupled to a DC bus interface configured to charge the battery pack using current received over the DC bus interface. A battery management system may be mounted within the axle housing and configured to control charging and discharging of the battery pack.

The power controller may be configured with control logic to intelligently control cooling through the electric drive axle. Various control algorithms may be employed to optimize cooling of one or more of the components within the axle housing. Although various control logic schemes may be employed, one example control scheme prevents coolant from flowing through the coolant circuit during vehicle cold-start operations but permits heat flow from the electric machines of the wheel end units. In other examples, upon reaching a threshold temperature value, the coolant circuit may flow coolant to the battery pack and continue to cool the battery pack throughout a prescribed temperature range or maximum temperature value. When the inverters, such as an IGBT inventor and an SIC inventor, reach one or more prescribed temperature values coolant may flow to the inverters and continue to cool the inverters through one or more prescribed temperature ranges or maximum temperature values. When the electric machines and gear sets of the wheel end units reach one or more prescribed temperature values coolant may flow to the wheel end units and continue to cool the electric machines and gear sets through one or more prescribed temperature ranges or maximum temperature values. The algorithm may provide coolant to the various components of the electric drive axle at the same or different temperature ranges and values. For example, the battery pack may be cooled at a target temperature value that is lower than a target temperature value of the IGBT inverter, which is lower than a target temperature value of the electric machines in the wheel end unit, which is lower than a target temperature value of the SIC inverter. The target temperature for cooling the gearboxes of the wheel end units may span a range of temperature values including the target temperatures values of the battery pack, inventors and electric machines.

Example Electric Drive Axle(s) for Work Vehicles

Referring to FIG. 1, a work vehicle 100 may be implemented as an agricultural tractor or any other heavy-duty work vehicle such as those used in the agriculture, construction, forestry and mining industries. The work vehicle 100 includes a chassis mounting a plurality of ground-engaging members 104, such as wheels or the illustrated tracks, supporting the chassis 102 off the ground. An engine housing 106 may be supported by the chassis 102 and contain an internal combustion engine, such as a diesel engine. An operator cab 108 may also be supported by the chassis 102 to be occupied by an operator of the work vehicle 100. It should be understood that the present disclosure may also pertain to autonomous work vehicles, in which case the operator cabin may be omitted.

Figure 2:
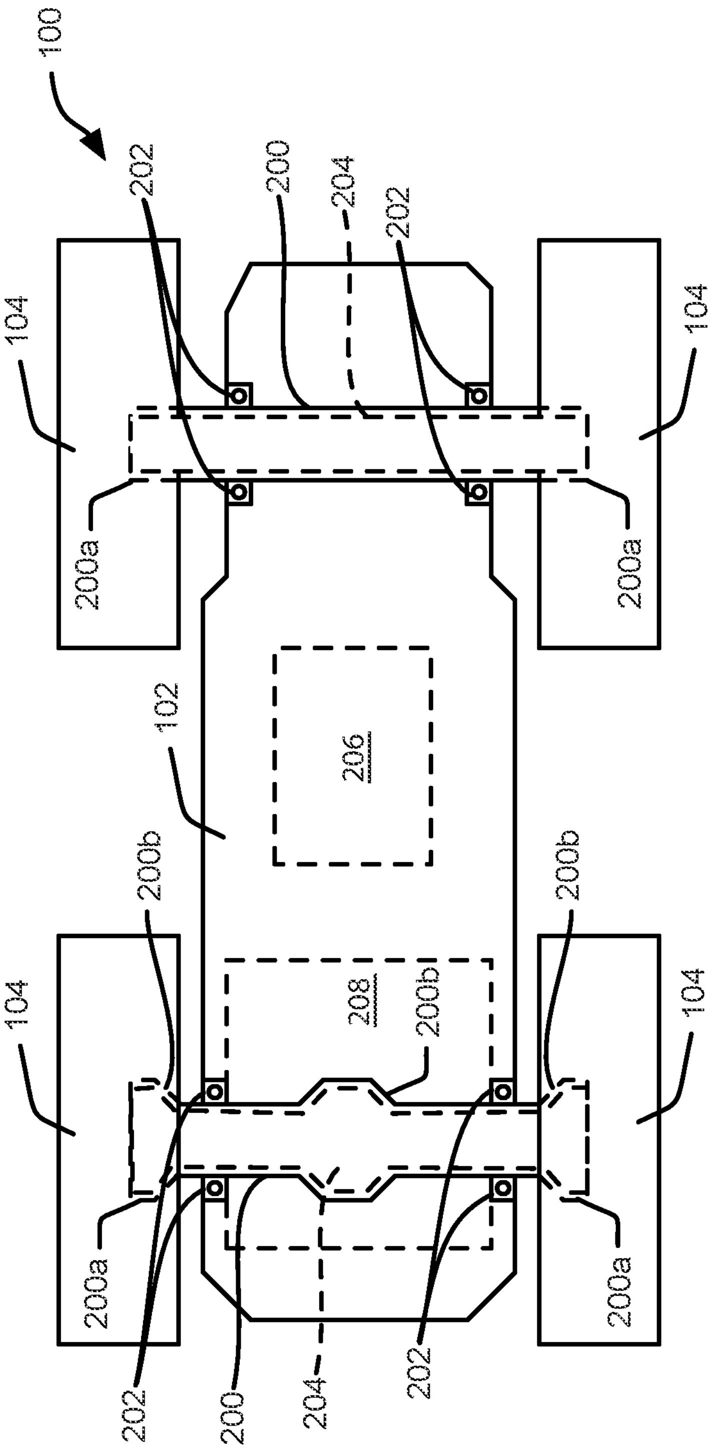
FIG. 2 is a schematic diagram of the underside of the work vehicle in accordance with an example embodiment.

Referring to FIG. 2, the work vehicle 100 may have a pair of the ground-engaging members 104 coupled to a common axle 110 that is contained within an axle housing 200 including openings 200*a* at opposite lateral ends of the work vehicle 100 that provide access to couple the axle 110 to the pair of ground-engaging members 104. The work vehicle 100 may define a longitudinal direction defined as the direction of travel of the work vehicle 100 when driven in a straight line on a flat surface. The lateral direction may be defined as perpendicular to the longitudinal direction and a vertical direction, where the vertical direction is parallel to the direction of gravity when the work vehicle 100 is on a flat surface.

The axle housing 200 may span the chassis 102 in the lateral direction with an axis of rotation of the axle 110 within the axle housing 200 being substantially (e.g., within 5 degrees of) parallel to the lateral direction. The axle housing 200 is structurally secured to the chassis 102 at a plurality of chassis mounts 202 by permanently fixed (e.g., welds) or removable connectors (e.g., bolts or other fasteners that are removable with tools). The axle housing 200 may extend outwardly from the chassis in the lateral direction and may extend into a hub of the ground-engaging members 104 on either lateral side of the chassis 102. The illustrated work vehicle 100 includes two axle housings 200 and four ground-engaging members 104. In alternative examples, multiple axles and axle housings may be mounted at the front of the work vehicle and multiple axles and axle housings may be mounted at the rear of the work vehicle. A corresponding number of ground-engaging members may used.

The axle housing 200 may include substantially cylindrical (e.g., all points within 0.1R of a cylinder of radius R) portions and may have various non-cylindrical features 200*b*. For example, a portion of the axle housing 200 may bulge outwardly near the middle of the axle housing 200 to accommodate certain internal components, such as a differential or other gear set. The axle housing 200 may have widened end portions to accommodate a gear reduction set coupling an axle to the ground-engaging members 104. The chassis 102, to which the axle housing 200 mounts, will therefore provide clearance for such non-cylindrical features. The axle housing 200 defines an interior volume 204 that provides a cylindrical and/or non-cylindrical spaces for receiving the axle 110 and any other axle components housed therein.

The work vehicle 100 may further define internal cavities or spaces that would conventionally provide clearance for a transmission (not shown), such as volume 206, an internal combustion engine (not shown), such as a volume 208 occupied by a transmission. Other cavities and open spaces may be provided, such as would conventionally be occupied by a fuel tank (not shown). In some cases, the electric drive axle may be retrofit to existing conventional work vehicles, and in other cases, the electric drive axle may be installed as part of the original manufacturing process. In either case, the electric drive axle may be installed onto the chassis of the work vehicle either within existing structural axle housings used in conventional set ups, or in structural axle housings that are dedicated to the electric drive axle and fit within the same space envelope as the conventional axles that they replace. Further, in retrofit and original manufacturing, the work vehicle platform may be modified from conventional platforms by removing internal combustion engine, transmissions, and other components, such as a fuel components (e.g., tank, pumps, hoses and the like). In cases where a gas generator is used, such as discussed below, the original fuel equipment may be retained, or replaced by other (such less capacity) fuel components. Other components may also be removed, replaced, or repurposed, such as certain cooling components (e.g., radiator, coolant pump, fans).

Figure 3A:
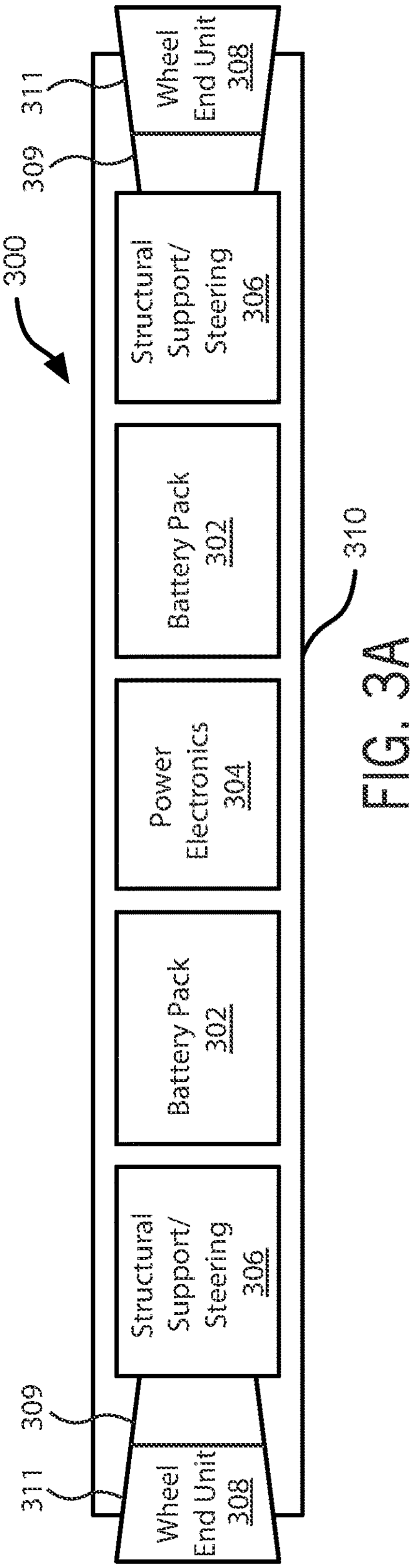
FIG. 3A is a schematic diagram of an electric drive axle accordance with an example embodiment.

FIG. 3A is a schematic representation of an electric drive axle 300 that may be used in place of an axle in the work vehicle 100. The electric drive axle 300 may be sized and configured to be mounted within an axle housing 200 of the work vehicle 100 either with or without modification and either with or without requiring the axle housing 200 to be removed during installation of the electric drive axle 300 and then reinstalled. The axle housing 200 may be modified to include one or more openings to accommodate various operational lines (e.g., electrical conduit and wires, hydraulic or cooling fluid hoses, etc.) but may remain otherwise unchanged. The axle housing 200 may therefore be repurposed as an axle housing of the electric drive electric drive axle 300.

The example electric drive axle 300 includes one or more battery packs 302. The battery packs 302 may be embodied as lithium-ion battery packs, for example. The battery packs 302 may include battery cells as well as associated circuitry for delivering power to and from the battery cells. The battery packs 302 may include temperature sensors and conduits for conducting coolant through the battery packs 302. The battery packs 302 may include a battery management system or circuits for interfacing with a battery management system. The battery packs 302 are sized to fit within the interior volume 204 of the axle housing 200 and may therefore have a cylindrical shape or conform to some other shape, such as the shape of the interior of a differential housing.

The electric drive axle 300 includes power electronics 304. The power electronics are discussed in greater detail with respect to FIG. 6 and include circuits for managing delivery of power to and from the battery packs 302, managing the temperature of the battery packs 302, delivering power from the battery packs 302 to wheel end units 308, and receiving power generated by the wheel end units 308. The power electronics 304 may include temperature sensors and possibly conduits for conducting coolant through the power electronics 304. Supply of power to the components 302, 304, 308 of the electric drive axle 300 may be controlled by the power electronics 304.

Each wheel end unit 308 includes an electric machine 309 and a gear reduction set 311 for driving the ground-engaging members 104 as well as an interface (e.g., hub) to which the ground-engaging members 104 may mount. The gear reduction set may be single speed or include a multi-speed transmission including selectable gear ratios, such as two or more gear ratios. The wheel end unit 308 may be implemented using the approaches described in some or all of the following patents, all of which are incorporated herein by reference in their entirety: U.S. Pat. Nos. 10,214,101; 10,107,363; and 10,207,580.

The axle housing 200 may have one or more structural supports 306 integrated into as a unitary part or secured thereto. The structural supports 306 provide mounting points for the wheel end units 308 that are sufficiently strong to bear the portion of the weight of the work vehicle 100 transmitted to the associated ground-engaging member mounted to each wheel end unit 308. The structural supports 306 further provide mounting points to couple the wheel end units 308 to the axle housing 200 or the chassis 102 of the work vehicle 100, or both, that are likewise sufficiently strong to bear the portion of the weight of the work vehicle 100 transmitted to the associated ground-engaging member 104 mounted to the wheel end unit 308. These structure supports may be in addition to or take the form of the chassis mounts 202.

Where the ground-engaging member 104 secured to the wheel drive 308 is steered, the electric drive axle 300 may include a steering mechanism, such as a steering knuckle and a control arm for engaging a steering actuator, which may constitute or supplement each of the structural supports 306. In some implementations, traction (i.e., "skid") steering may be performed by selecting different speeds for the right and left sides of the work vehicle 100 in which case a steering mechanism is not included in the electric drive axles 300.

In the certain example embodiments, the electric drive axle 300 may include a housing 310 that is positioned within the axle housing 200. The housing 310 may provide isolation from debris and abrasion but otherwise not provide significant structural strength to the electric drive axle 300, and thus may be consider "non-structural." The wheel end units 308 may be located completely within the housing 310 or may be partially within the housing 310 such that portions of the wheel end units 308 extend outwardly from the housing 310 and the axle housing 200.

Figure 3B:
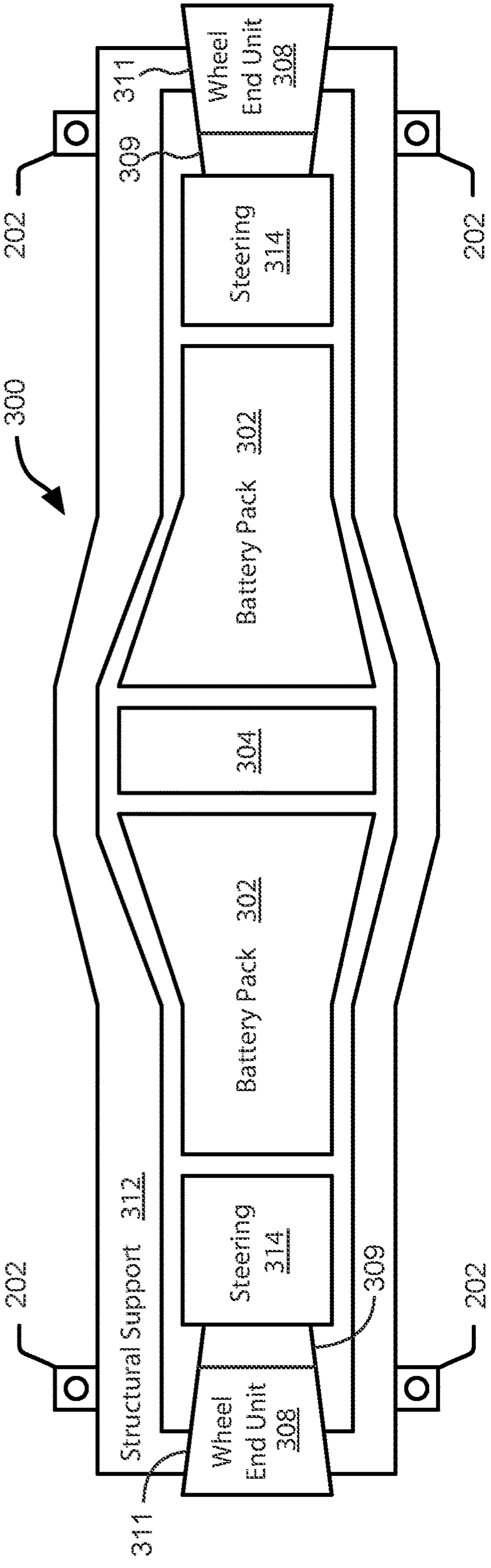
FIG. 3B is a schematic diagram of an electric drive axle with integrated structural support in accordance with an example embodiment.

Referring to FIG. 3B, alternatively, the electric drive axle 300 may include an outer housing or structural support 312 that can secure to the chassis 102 of a work vehicle 100 in place of the axle housing 200 without modification of the chassis 102. The outer structural support 312 may be a hollow structure providing an axle housing for the components 302, 304, 306, 308 of the electric drive axle 300, while also providing sufficient structural support to transmit weight of the work vehicle 100 to the wheel end units 308 either directly or through steering mechanisms 314. This outer housing or structure support 312 may be in addition to or take the form of the chassis mounts 202. The structural support 312 may have an outer surface that conforms to the surfaces of the axle housing 200 that interface with the chassis 102, including the chassis mounts 202. For example, the structural support 312 may include one or more enlarged volume regions (e.g., corresponding to a differential or reduction gear drive) to take advantage of space provided in the chassis 102. Surfaces of the structural support 312 that do not interface with the chassis 102 may differ from the axle housing 200 replaced by the structural support 312 subject to constraints to provide appropriate amounts of ground clearance. Accordingly, the structural support 312 may have a size in the longitudinal direction relative to the size of the axle housing 200 to provide space for additional or larger battery packs 302 than could fit within the axle housing 200. For example, the structural support 312 may be between one and ten times larger along the longitudinal direction than the axle housing 200 replaced by the electric drive axle 300. Likewise, the volume within the structural support 312 may be between one and ten times larger than the volume within the axle housing 200, for example.

Figure 4A:
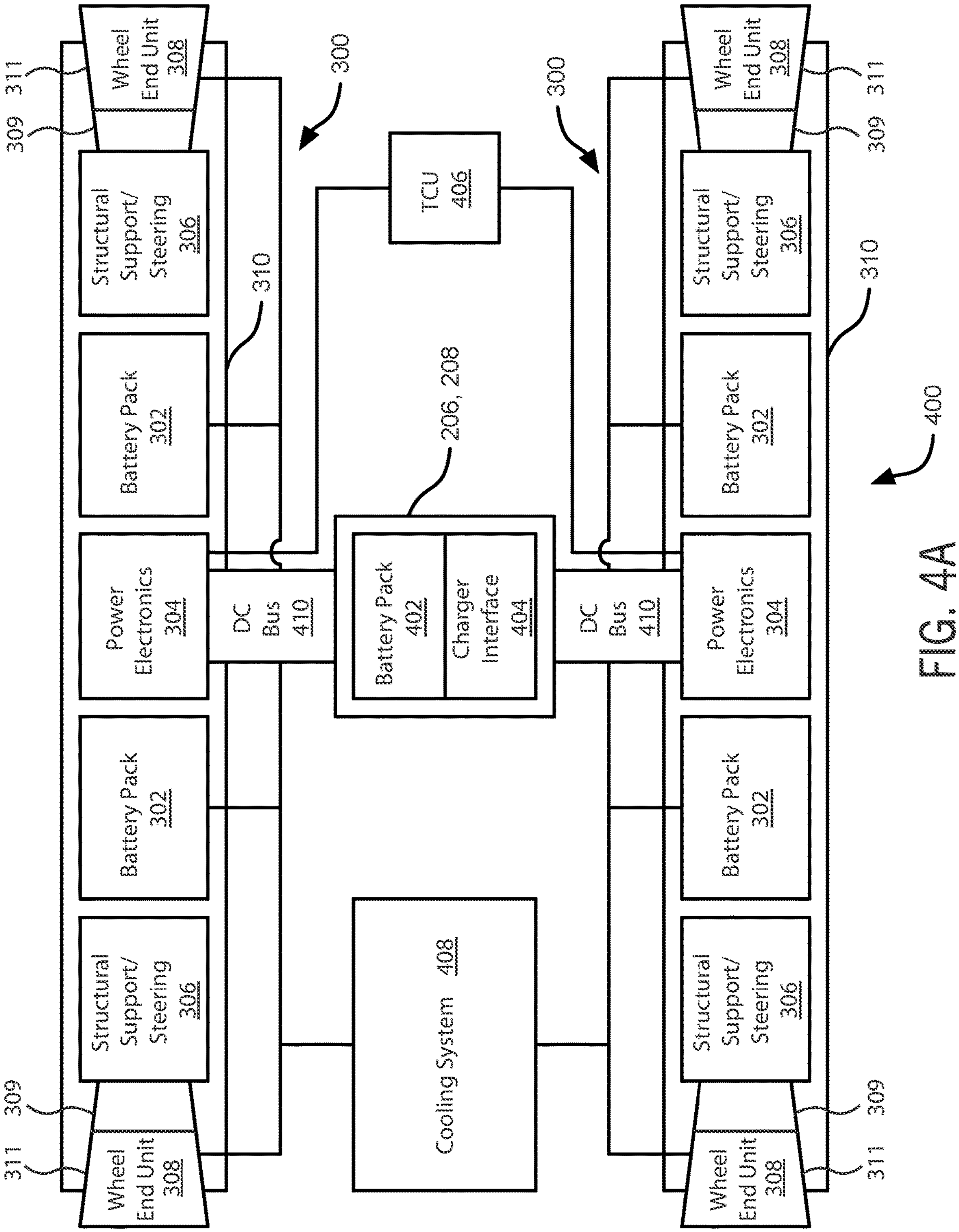
FIG. 4A is a schematic diagram of a multi-axle electric drive train including the electric drive axle in accordance with an example embodiment.

Referring to FIG. 4A, the work vehicle 100 may include an axle system 400 of two or more electric drive axles 300. Each electric drive axle may be identical or differ in one more respects, including the drive components and the housing and support members for the drive components. This axle system 400 may include one or more additional battery packs 402 to supplement the capacity of the battery packs 302 of the electric drive axles 300. The axle system 400 may also include a charger interface 404 defining a socket and circuits for interfacing with a charging station or an electrical grid. The one or more additional battery packs 402 and the charger interface 404 may be installed in one or both of the open volumes 206, 208 or other cavities defined between the structural members of the work vehicle chassis, such as a cavity for a fuel tank.

The battery packs 402 and the charger interface 404 may be coupled to a direct current (DC) bus 410. The DC bus 410 may be composed of electrical wires or bus bars capable of conducting high levels of current and voltage, such as at least 30-90 amps and at least 400-800 volts. The power electronics 304 of the electric drive axles 300 may be coupled to the same DC bus 410 or separate DC buses 410.

In various embodiments, the power electronics 304 of the electric drive axles 300 may be coupled to a traction control unit (TCU) 406. The TCU 406 may include logic for maintaining traction and stability of the work vehicle 100 over off-road terrain during transport and work operations. The TCU 406 may further control selection among multiple gears provided by the wheel end units 308 based on drive commands based on drive commands, such as acceleration and braking commands and based on the current speed of the work vehicle 100. The TCU 406 may detect the current state of the work vehicle 100 by means of an accelerometer, feedback from the power electronics 304, or other source. For example, torque on each ground-engaging member 104 may be measured using a torque sensor or measuring current drawn by the electric machines 309 of the wheel end units 308 connected thereto. The torque along with speed as sensed using the accelerometer or speed of rotation of the electric machines 309 may be used by the TCU 406 to select current supplied to each wheel end unit 308 of each electric drive axle 300 to avoid loss of traction due to spinning of a ground-engaging member 104 relative to the ground, to maintain stability, to steer the work vehicle 100, or to perform other operational tasks.

The axle system 400 may also include a cooling system 408 in various embodiments. An example cooling system 408 is described in greater detail below with respect to FIG. 6. The cooling system 408 may include a heat exchanger (e.g., a radiator). The heat exchanger may be placed in the same location as a conventional radiator used to cool an internal combustion engine. Coolant from the cooling system 408 may be used to cool some or all of the battery packs 302, power electronics 304, and wheel end units 308.

Figure 4B:
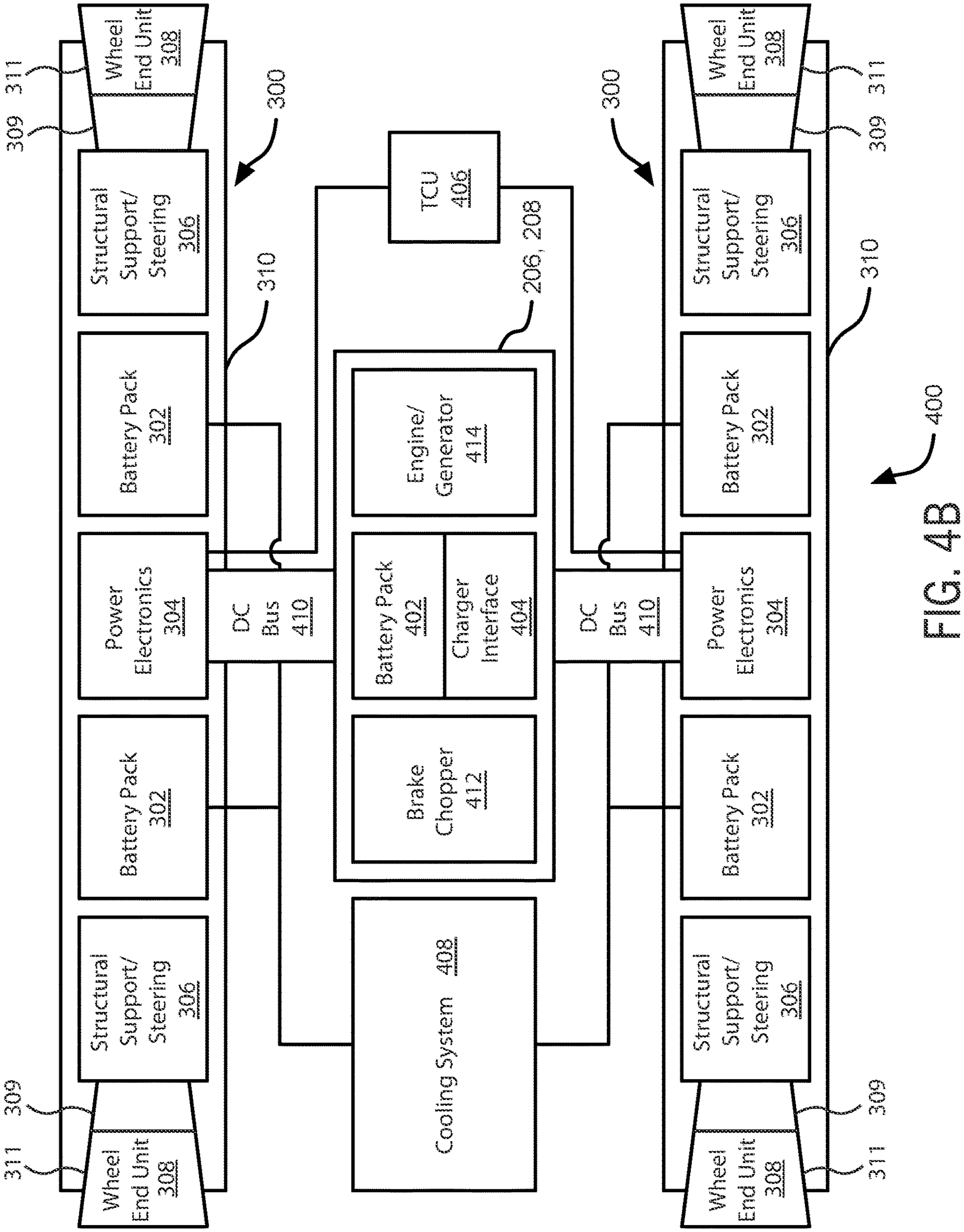
FIG. 4B is a schematic diagram of a multi-axle electric drive train including the electric drive axle in accordance with another example embodiment.

Referring to FIG. 4B, in other embodiments, the open volumes 206, 208 or other cavities in the work vehicle chassis 102 due to the obsolescence of an internal combustion engine, such as a cavity occupied by a fuel tank, may additionally or alternatively store components other than an additional battery pack 402 and charger interface 404. For example, a brake chopper 412 may be installed. A brake chopper receives current output from the electric machines 309 of the wheel end units 308 when the electric machines 309 act as generators, such as due to coasting or rolling down an incline. The brake chopper 412 imposes a resistance in the path of the current thereby resisting the current and causing the resistance of the motor to movement to increase. The brake chopper 412 may include fins, passages for flow of cooling fluid from the cooling system 408, or other structures to dissipate heat generated by the resistance. The brake chopper 412 may receive current from the wheel end units 308 by way of the DC bus 410. Current received from the electric machines 309 of the wheel end units 308 over the DC bus 410 may additionally or alternatively be used to charge the battery packs 302 of the electric drive axle 300 and may be supplied over the DC bus 410 to regeneratively charge the battery pack 402. For example, absent a braking command from an operator of the work vehicle 100, generated current may be used to charge the battery packs 302, 402. The generated current may additionally be supplied to the brake chopper 412 in response to a braking command received from the operator of the work vehicle 100.

In some embodiments a small engine and generator 414 may be installed. The engine and generator 414 are small relative to a main propulsion engine that is replaced by the electric drive axles 300. The engine and generator 414 may generate electricity to extend the range of the work vehicle 100. A corresponding fuel tank may be coupled to the engine and generator 414 to supply fuel to the engine and generator 414. The fuel tank may be a dedicated fuel take (of less capacity) or a primary fuel (of larger capacity) as conventionally used to supply fuel to a main propulsion engine.

Battery packs 302 operate may perform best within a prescribed operating temperature range. Below this prescribed battery operating temperature range, the battery packs 302 may begin to lose capacity and above this battery operating temperature range, the battery packs 302 may also lose capacity and become combustion hazards. Other components, such as the power electronics 304 and wheel end units 308 generate heat that may be carried away from the electric drive axle 300 to avoid overheating.

Figure 5:
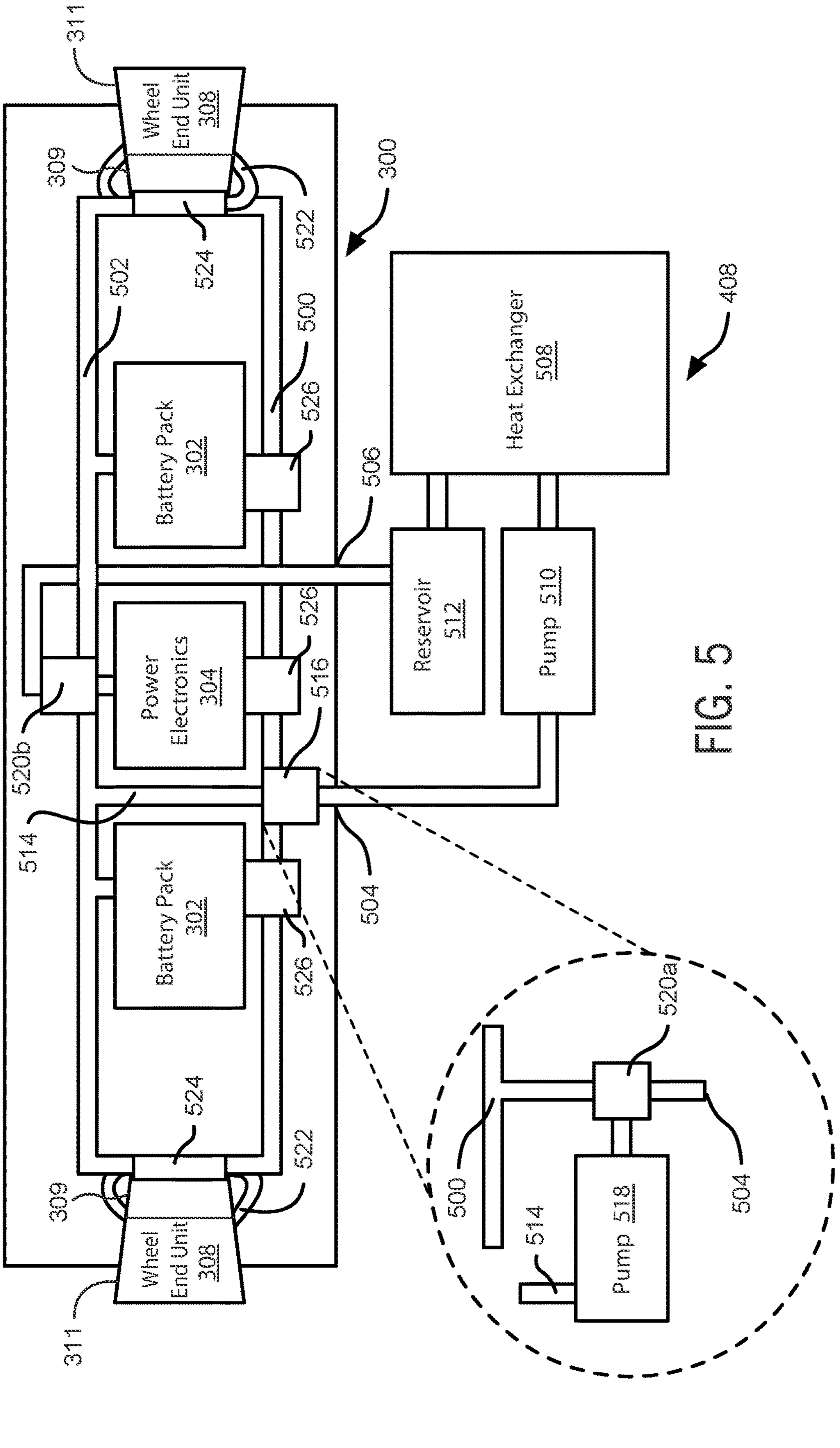
FIG. 5 is a schematic diagram of an electric drive axle and cooling system in accordance with an example embodiment.

Referring now to FIG. 5, in various embodiments, the electric drive axle 300 have include structures for cooling and heating. For example, the electric drive axle 300 may include plumbing lines or channels for conducting coolant from an inlet to some or all of the battery packs 302, the power electronics 304, and the wheel end units 308 and to conduct coolant from some or all of the battery packs 302, the power electronics 304, and the wheel end units 308 to an outlet.

In the illustrated example, the electric drive axle 300 may include an inlet manifold 500 and an outlet manifold 502 in fluid communication with an inlet 504 and an outlet 506, respectively. The inlet 504 and outlet 506 are in fluid communication with the cooling system 408, such as by separate plumbing lines (e.g., rigid conduit, flexible hoses, etc.) or via passages formed into the wall structure of the axle housing 200 or support structure 312. Such passages may define a serpentine, zig-zag, or back-and-forth pattern and may be milled, molded, or otherwise formed into the surface or interior of the housing walls. Various couplers and fittings may be mounted to the axle housing 200 or structural support 312 for facilitating attachment to the plumbing lines. The cooling system 408 includes a heat exchanger 508, which may be in dedicated radiator having a compact form-factor. Alternatively, the heat exchanger 508 may be the same radiator used to cool an internal combustion engine formerly mounted in the volume 208, and may mount to the same location, and fans for forcing air over the radiator for cooling the internal combustion engine may be used to force air over the heat exchanger 508 in a like manner.

The cooling system 408 may include other components internal or external to the axle housing 200 of the electric drive axle 300, such as pump 510 and a reservoir 512 for containing coolant. The reservoir 512 may be coupled to the outlet 506 to receive coolant returned from the electric drive axle 300 and the pump 510 may be coupled to the inlet 504. The pump 510 draws coolant from the reservoir 512 through the heat exchanger 508 and forces the coolant into the electric drive axle 300. Although a single electric drive axle 300 is shown in FIG. 5, two, three, or more electric drive axles 300 may be coupled to the pump 510 and reservoir 512. The coolant may be water, propylene glycol, or other cooling fluid.

The pump 510 may be mounted directly to the axle housing 200 or to the chassis 102 of the work vehicle 100. The pump 510 may be the same pump used to pump coolant through the internal combustion engine replaced by the one or more electric drive axles 300. Alternatively, the pump 510 may be a dedicated pump for the electric drive axles 300 and likely of lower capacity and cost as those used in conventional internal combustion engine applications. However, the pump 510 may mount to the same location and define the same hole pattern or other mounting structures as the replaced pump for mounting to the chassis 102 of the work vehicle 100.

The cooling system 408 may be controlled by the power electronics 304 or be controlled independently of the power electronics 304. For example, the power electronics 304 may activate the pump 510 based on temperatures of one or more components 302, 304, 308. Alternatively, a separate controller may activate the pump 510 based on a sensed pressure of fluid within the cooling system 408. For example, a controller may be configured to activate the pump 510 to maintain a pressure at the inlet 504 of the axle assembly within a predefined range independently from the power electronics 304 or other controller within the electric drive axle 300.

In some situations, the battery packs 302 may be below the battery operating temperature range and need to be warmed. In some embodiments, heat from one or both of the power electronics 304 and wheel end units 308 is used to heat the battery packs 302. To that end, a bypass path 514 may be provided within the electric drive axle 300 between the inlet manifold 500 and the outlet manifold 502. In this manner, coolant may be circulated internally within the electric drive axle 300 in bypass of the cooling system 408 until cooling of the battery packs 302 is required.

A bypass assembly 516 may be used to manage bypass circulation of coolant. The bypass assembly 516 may include a bypass pump 518 and a bypass valve 520*a*. The bypass valve 520*a* has a bypass state in which an outlet of the bypass pump 518 is coupled to the inlet manifold 500 and the inlet manifold 500 is partially or completely isolated from the inlet 504. The inlet of the bypass pump is coupled to the bypass path 514 such that the bypass pump 518 draws coolant from the outlet manifold 502 through the bypass path 514 and forces the coolant into the inlet manifold 500. The circulation of the coolant will draw heat from the power electronics 304 and wheel end units 308 and the heated coolant will warm the battery packs 302.

When cooling of some or all of the battery packs 302, power electronics 304, and wheel end units 308 is required, the bypass pump 518 may be deactivated and the bypass valve 520*a* may be placed in a non-bypass state in which the bypass valve 520*a* couples the inlet manifold 500 to the inlet 504 with less resistance relative to the bypass state such that the inlet manifold receives more coolant from the cooling system 408 relative to the bypass state.

In some embodiments, a second bypass valve 520*b* may be used. In the bypass state, the bypass valve 520*b* partially or completely isolates the outlet manifold from the outlet 506. In the non-bypass state, the bypass valve 520*b* couples the outlet manifold 502 to the outlet 506 and allows fluid to exit to the cooling system 408 with less resistance relative to the bypass state.

In some embodiments, the valves 520*a*, 520*b* only switch between bypass and non-bypass states. In other embodiments, the valves 520*a*, 520*b* may also be in intermediate states between the bypass and non-bypass states. For example, the bypass valves 520*a*, 520*b* may be placed in bypass state that completely isolates the inlet and outlet manifolds 500, 502 from the cooling system 408 when the temperatures of the battery packs 302 are below the battery operating temperature range. When the temperatures are within the battery operating temperature range, the bypass valves 520*a*, 520*b* may be in an intermediate state with the degree of resistance to flow through the inlet 504 and outlet 506 decreasing with increasing of the temperatures. When the temperatures of the battery packs 302 reach the upper end of the battery operating temperature range, or some threshold below the upper end of the battery operating temperature range, the bypass valves 520*a*, 520*b* may be placed in the non-bypass state having the least resistance to flow through the inlet 504 and outlet 506 and having the greatest resistance to (e.g., complete stoppage of) flow through the bypass path 514 for a predefined range of operating states of the bypass valves 520*a*, 520*b*.

The pump 518 may likewise be operated in only a bypass state (on) and non-bypass state (off) or may be operated in intermediate states between the bypass state and the non-bypass state. The electric current supplied to the pump 518 may be supplied at a rate that is inversely proportional to the battery temperature up until the valves 520*a*, 520*b* are placed in the non-bypass state at which point the pump 518 is turned off.

It should be noted that in some embodiments the pump 518 may be omitted. For example, the proximity of the battery packs 302 to the power electronics 304 and wheel end units 308 may be sufficient to warm the battery packs 302 such that only isolation from the cooling system 408 is performed using one or both valves 520*a*, 520*b*.

Each of the battery packs 302 may define a coolant path coupled to the inlet manifold 500 and the outlet manifold 502. The coolant path may pass among the cells of the battery pack 302 or extend around the exterior of the cells. The power electronics 304 likewise define a coolant path therethrough that is connected to the inlet manifold 500 and the outlet manifold 502. As described with regard to FIGS. 7A-7C below, the wheel end units 308 may likewise define a coolant path passing through or over the wheel end units 308 and connected to the inlet manifold 500 and the outlet manifold 502. In some embodiments, the wheel end unit 308 has an oil circulation path 522 through which lubricating oil is circulated. The oil may be circulated using an electric pump or a mechanical pumping mechanism. A heat exchanger 524 may interface with the oil circulation path 522 to transfer heat between the coolant and the oil circulation path. The heat exchanger 524 may have an inlet coupled to the inlet manifold 500 and an outlet coupled to the outlet manifold 502.

The amount of coolant passing through each of the battery packs 302, power electronics 304, and the wheel end units 308 may be controlled by one or more valves 526. For example, the valves 526 may control the flow of fluid through one or more components and opens in proportion to temperatures of the one or more components. The valves 526 may be an electrically controlled valve controlled by logic within the power electronics 304 or other component. In the illustrated embodiment, multiple dedicated valves 526 control the flow of coolant through each of the battery packs 302, the power electronics, and the wheel end units 308. However, other arrangements are possible. For example, the battery packs 302 may operate at about the same load such that a single valve 526 controls the flow of coolant to multiple battery packs 302.

The operation of the valves 526 may vary based on whether the valves 520*a*, 520*b* are in a bypass or non-bypass state. In the non-bypass state, each valve 526 may limit the flow of coolant through one or more components when a temperature of the one or more components is below a temperature threshold defined for the one or more components. However, where heating of the battery packs 302 is needed, the valves 526 may be placed in their most open state to facilitate free circulation of fluid to pick up heat from the power electronics 304 and wheel end units 308 even when the temperatures of the power electronics 304 and wheel end units 308 are below their corresponding temperature thresholds.

Figure 6:
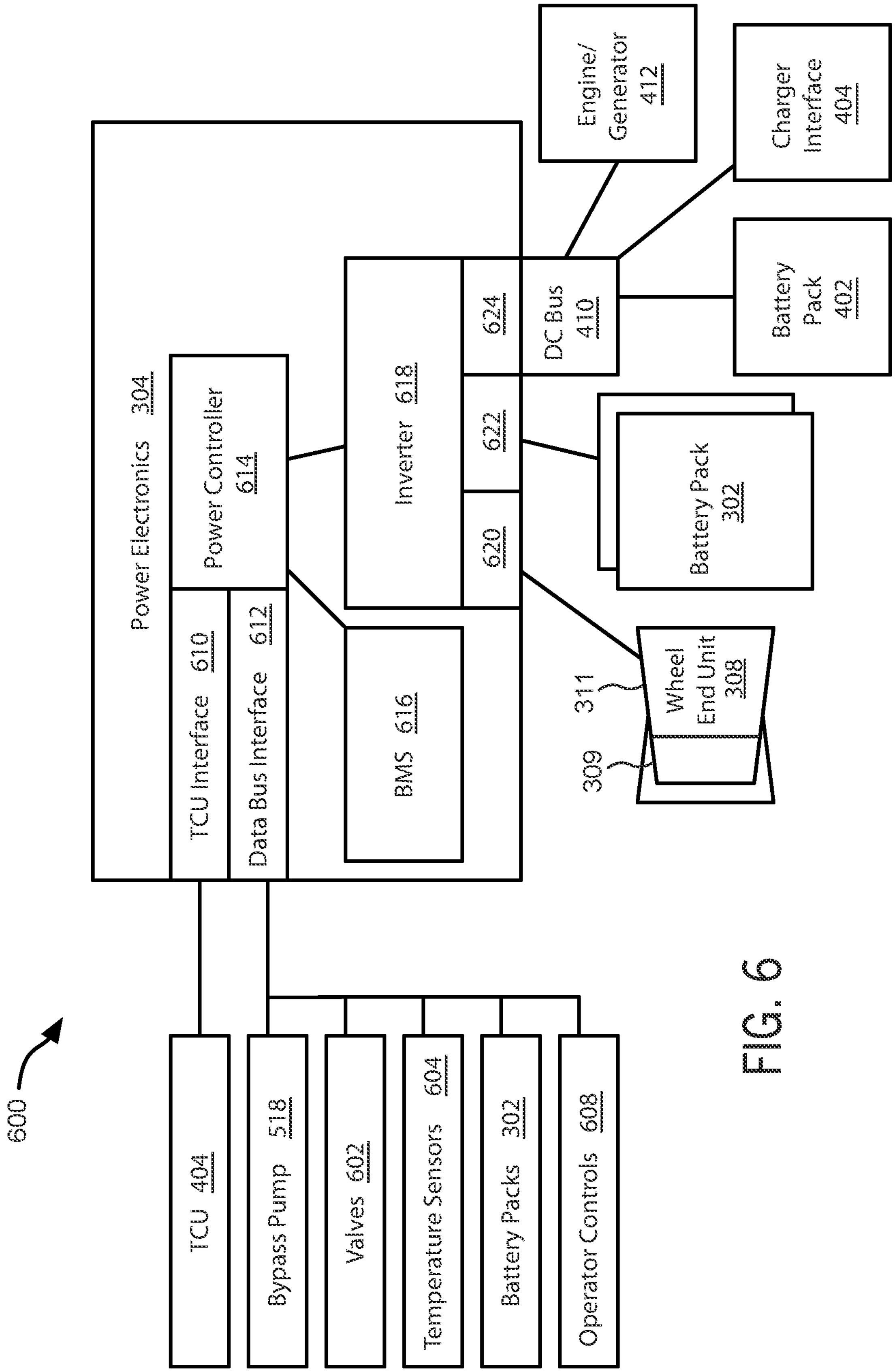
FIG. 6 is a schematic diagram of a control system for an electric drive axle in accordance with an example embodiment.

FIG. 6 illustrates an example control system 600 for the electric drive axle 300. The power electronics 304 may include circuits, computing capacity, or other components for controlling operation of the electric drive axle 300. However, the functionality ascribed herein to the power electronics 304 may also be performed by one or more other components. The power electronics 304 may be coupled to the bypass pump 518 and supply current to the bypass pump 518 as described above. The power electronics 304 may be coupled to the valves 602 (e.g., some or all of the valves 520*a*, 520*b*, 526). The power electronics 304 may be coupled to various vehicle sensors (e.g., speed, acceleration, pressure, temperature, etc.), such as temperature sensors 604, of some or all of the battery packs 302, power electronics 304 itself, and wheel end units 308.

The power electronics 304 may define interfaces such as a TCU interface 610 for interfacing with the TCU 406. Other components, such as the bypass pump 518, valves 602, temperature sensors 604, battery packs 302, and operator controls may communicate with the power electronics 304 by way of a data bus interface 612, such as a controller area network (CAN) bus, onboard diagnostics (OBD) bus, or other type of bus or network communication protocol and associated electronic components. The power electronics 304 may include a power controller 614. The power controller 614 may include a computing device configured to receive inputs from sensors, such as temperature sensors 604, inputs from the TCU 406, and operator inputs received through the operator controls 608 and control operation of the electric drive axle 300 accordingly. For example, the power controller 614 may receive the outputs of the temperature sensors 604 and control operation of the bypass pump 518 and valves 602 according to the outputs of the temperature sensors 604, as described above with respect to FIG. 5. In another example, the power controller 614 receives outputs from the operator controls 608 that command acceleration, deceleration, turning, or other operations. The power controller 614 controls power supplied to, or generated by, the wheel end units 308 to implement the operator commands either alone or in cooperation with the TCU 406 to avoid tipping and wheel spin.

The operator controls 608 may be coupled to the data bus interface 612. The operator controls 608, prior to conversion of the work vehicle 100 to electric drive, may be configured to send messages on the data bus in response to changes in state of the operator controls 608 (e.g., a state of an accelerator pedal, a state of a brake pedal, and a steering angle of a steering wheel). The messages may be sent directly by the operator controls 608 or by way of an electronic control unit (ECU). Accordingly, the power controller 614 may receive these messages through the data bus interface 612 and control operation of the wheel end units 308 accordingly to attempt to achieve acceleration, braking, and/or turning commanded by a user operating the operator controls 608.

In still other embodiments, the battery packs 302 may provide battery state information to the power controller 614. The battery state information may indicate the amount of current flowing in or out of the battery packs 302 and the voltage supplied by or to the battery pack 302. The battery state information may further include the output of one or more temperatures sensors 604 of the battery pack 302. The power controller 614 may provide the battery state information to a battery management system (BMS) 616. The BMS 616 will then control the amount of current input to each battery pack 302 during charging or drawn from each battery pack 302 during use to prolong the useful life of each battery pack 302 and avoid unsafe operation of each battery pack 302. Note that in some embodiments, each battery pack 302 may include its own BMS such that the power electronics 304 do not include the BMS 616.

The power electronics 304 may include one or more inverters 618, such as an insulated-gate bipolar transistor (IGBT) inverter and a silicon Carbide (SiC) inverter. The inverter 618 converts DC current into alternating current (AC) current supplied to the wheel end units 308 through an output port 620. The inverter 618 receives DC current from the battery packs 302 through an input port 622. The inverter 618 may include or be coupled to an interface 624 to the DC bus 410 for receiving DC current from the battery pack 402, charger interface 404, and/or the engine and generator 414. Current generated by the wheel end units 308 during braking or coasting may be converted to DC current and be transmitted by the inverter 618 to the battery packs 302 through the input port 622 and/or transmitted over the DC bus 410 through the interface 624 to charge the battery pack 402.

The power electronics 304 may control opening of the valves 526 according to temperatures detected using the temperature sensors 604, as described above. In certain example embodiments, the power controller 614 make execute control algorithms with logic defining a regimented control scheme for various operational states of the work vehicle 100 and temperature states of one or more components of the electric drive axle 300. The power controller 614 may execute control algorithms with logic that provides coolant to the various components of the electric drive axle 300 at the same or different temperature ranges and values. For example, the battery packs 302 may be cooled at a target temperature value that is lower than a target temperature value of the IGBT inverter, which is lower than a target temperature value of the electric machines in the wheel end unit, which is lower than a target temperature value of the SIC inverter. The target temperature for cooling the gear reduction sets 311 of the wheel end units 308 may span a range of temperature values including the target temperatures values of the battery packs 302, inverter 618 and electric machines 309.

An example of one control scheme is as follows. A "cold start" operation of the work vehicle 100 may be defined as starting the work vehicle 100 after not being operated for a prescribed time period (e.g., about 8 hours), or with the ambient temperature (or a component temperature (e.g., battery), being below a threshold temperature (e.g., less than about 10° C.), or both. During a cold start operation, the power controller 614 may control the cooling system to open the bypass and prevent cooling the battery packs 302. Depending on conditions, the power controller 614 allow for passive heating from the wheel drive units 308 or energize a supplemental heat source, if available. Upon reaching a threshold temperature value (e.g., about 25° C.), the coolant circuit may flow coolant to the battery packs 302 and continue to cool the battery pack 302 throughout a prescribed temperature range (e.g., about 10-35° C.) or maximum temperature value. When the inverters 618 reach one or more prescribed temperature values coolant may flow to the inverters and continue to cool the inverters through one or more prescribed temperature ranges or maximum temperature values. For example, an IGBT inventor may be cooled at and between about 50-60° C. and an SiC inverter may be cooled at and between about 80-90° C. When the electric machines 309 and the gear reduction sets 311 of the wheel end units 308 reach one or more prescribed temperature values coolant may flow to the wheel end units and continue to cool the electric machines and gear sets through one or more prescribed temperature ranges or maximum temperature values. For example, the electric machines 309 may be cooled at and between about 65-75° C. and the reduction gear sets 311 may be cooled about at and between about 40-90° C.

Figure 7A:
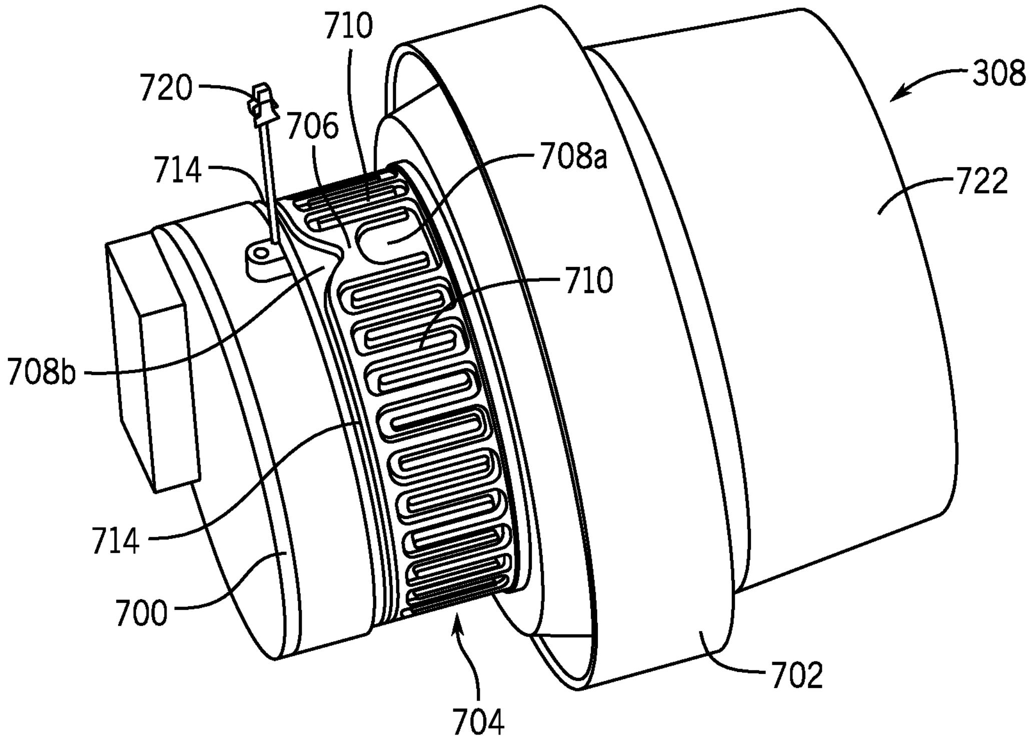
FIGS. 7A-7C are views of an example wheel end unit for an electric drive axle in accordance with the present disclosure.
Figure 7B:
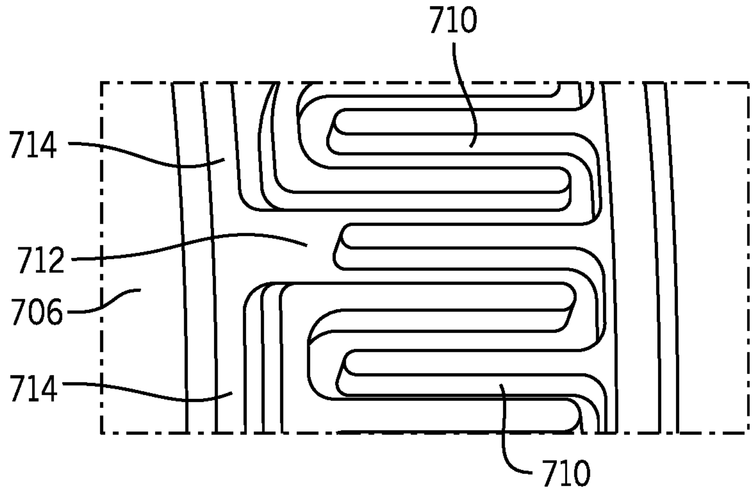
Figure 7C:
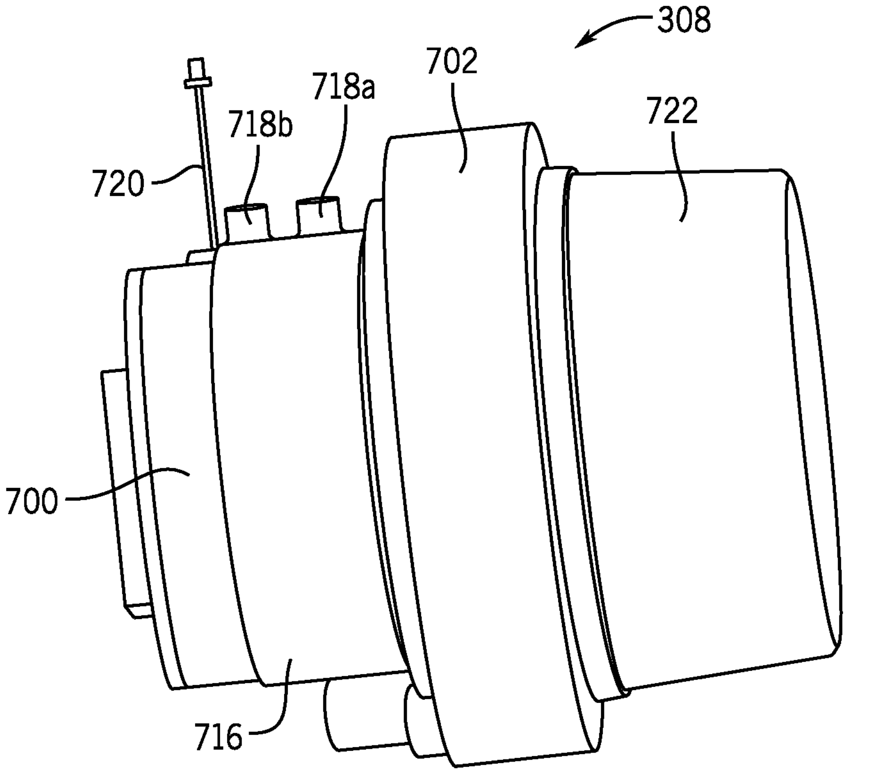

FIGS. 7A-7C illustrate an example implementation of a heat exchanger 524 for a wheel end unit 308. The wheel end unit 308 may include a motor housing 700 housing an electric machine 309 (e.g., a motor/generator) and a gear housing 702 housing a gear reduction set 311. The wheel end unit 308 may define an axial direction defined as a line substantially (e.g., within two degrees of) parallel to an axis about which a wheel driven by the wheel end unit 308 will rotate. A radial direction may be defined as movement or an orientation that passes through the axial direction and is perpendicular to the axial direction in a plane including the axial direction. A circumferential direction may be defined as a curve or surface that is centered on the axial direction or tangent to a circle centered on the axial direction.

The motor housing 700 defines a coolant path 704. The coolant path 704 may be milled, molded, or otherwise formed in the motor housing 700 itself or be formed in a sleeve 706 secured around the motor housing 700. The outer surface of the sleeve 706 or motor housing 700 may conform to a cylinder centered on the axial direction. The coolant path may include an inlet area 708*a* and an outlet area 708*b*, which may each be embodied as a recess defined in the cylindrical outer surface and connected to one another only by the coolant path 704 that extends between the inlet area 708*a* and the outlet area 708*b*. In the illustrated embodiment, the coolant path 704 includes outbound portions 710 that extend outwardly from the inlet area 708*a* and extend circumferentially around the motor housing 700 to a point that is between 150 and 180 degrees offset from the inlet area 708*a*.

In the illustrated embodiment, the outbound portions 710 have a shape that may be described as some or all of serpentine, zig-zag, and back-and-forth. Stated differently, the length of the fluid path defined by each outbound portion 710 may be between two and fifteen times the length of the outer surface of the sleeve 706 in which the outbound portion 710 is formed as measured along the circumferential direction. The shape of the outbound portions 710 increases the amount of area of the sleeve in contact with coolant fluid and increase the amount of time required for coolant fluid to pass through the coolant path 704 to increase heat transfer into the coolant fluid. The outbound portions 710 may extend to a transition region 712 centered at a point between 150 and 180 degrees offset from the inlet area 708*a* along the circumferential direction. Inbound portions 714 of the coolant path 704 extend from the transition region 712 back to the outlet area 708*b* that is located adjacent the inlet area 708*a*. For example, the outlet area 708*b* may be substantially aligned with inlet area 708*a* along the circumferential direction (e.g., centers of both inlet and outlet areas 708*a*, 708*b* within one and five degrees of one another along the circumferential direction). The inbound portions 714 may be embodied as a circumferential groove formed in the sleeve 706 and extending to the transition region 712. The transition region 712 may be embodied as a groove connecting the outbound portions 710 to the inbound portions 714. In the illustrated embodiment, the inbound portions 714 are relatively straight, such as in the form of grooves substantially (e.g., within 2 degrees of) parallel to the circumferential direction at all points along the inbound portions 714. The inbound portions 714 may be implemented as a single groove extending completely around the sleeve 706 and substantially (e.g., within 2 degrees of) parallel to the circumferential direction at all points thereon. In other embodiments, the inbound portions 714 may have a shape that may be described as some or all of serpentine, zig-zag, and back-and-forth. Stated differently, the length of the fluid path defined by each inbound portion 714 may be between one and fifteen times the length of the outer surface of the sleeve 706 in which the inbound portion 714 is formed as measured along the circumferential direction.

Coolant may be contained within the coolant path 704 by means of an outer sleeve 716 secured over the sleeve 706. Gaskets, caulking, or other sealant may be positioned between the outer sleeve 716 and the sleeve 706 to prevent leakage of coolant and possibly to constrain the coolant to substantially (e.g., at least 90 percent of the coolant) follow the coolant path 704 between the inlet area 708*a* and the outlet area 708*b* as defined by the outbound portions 710 and inbound portions 714.

The outer sleeve 716 may define an inlet port 718*a* and an outlet port 718*b* that are aligned over the inlet area 708*a* and outlet area 708*b*, respectively, along the circumferential and axial directions. Fluid forced into the inlet port 718*a* enters the inlet area 708*a* and is forced out along the outbound portions 710, back along the inbound portions 714, to the outlet area 708*b*, and out of the outlet port 718*b*. The inlet port 718*a* may be connected to the inlet manifold 500 and the outlet port 718*b* may be connected to the outlet manifold 502, such as by means of hoses and possibly with intervening valves 526 to control the amount of fluid forced into the inlet port 718*a*.

Various modifications may be made to the illustrated embodiment. The roles of the illustrated inlet and outlet areas 708*a*, 708*b* may be reversed such that that fluid flow is into the inbound portions 714 and back from the outbound portions 710. The illustrated coolant path 704 may be formed by recesses extending outwardly from an inner surface of the sleeve 706 whereas the sleeve 706 is omitted or has a smooth outer surface interfacing with the sleeve 706. Circumferential grooves may be formed in the sleeve 706 and/or outer sleeve 716 to receive gaskets for facilitating sealing. An oil circulation path within the motor housing 700 may pass adjacent to or through the sleeve 706 to facilitate heat transfer. In other embodiments, cooling of the motor housing 700 is sufficient to regulate the temperature of the wheel end units 308.

Sensors, such as a temperature sensor 604, oil pressure sensor, speed sensor, or the like may be positioned within the motor housing 700 and/or gear housing 702 and be connected to electric leads 720 extending outwardly from the motor housing 700 and/or gear housing 702 and connecting to the power electronics 304.

A hub 722 secures to the gear housing 702 and provides a mounting point for securing to a ground-engaging member 104. The hub 722 may therefore include a pattern of bolt holes, centering structures, or other structures for facilitating the securement of a ground-engaging member 104 to the wheel end unit 308. The hub 722 may have the same interface of bolt holes, centering structures, or other structures as the axle replaced with the electric drive axle 300 such that specialized adapters are not required.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

The description of the present disclosure has been presented for purposes of illustration and description, but it is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. An electric drive axle for a work vehicle having a chassis supported off the ground by ground-engaging members, the electric drive axle comprising:

an axle housing configured to mount to the chassis, the axle housing defining an interior cavity disposed between opposite ends defining openings, the axle housing having an inlet and an outlet;

wheel end units secured at least partially within the axle housing, each wheel end unit defining a hub for engaging one of the ground-engaging members through one of the openings, each wheel end unit having drive components configured to rotate the hub of each wheel end unit;

a battery pack mounted within the axle housing between the wheel end units;

a power controller mounted within the axle housing between the wheel end units, the power controller electrically coupled to the wheel end units and the battery pack and configured to control supply of power from the battery pack to the wheel end units; and plumbing lines within the axle housing configured to convey a coolant from the inlet to the battery pack and the power controller and from the battery pack and the power controller to the outlet.

2. The electric drive axle of claim 1, further comprising:

an inlet manifold positioned within the axle housing and coupled to the inlet and to the battery pack and the power controller;

an outlet manifold positioned within the axle housing and coupled to the outlet and to the battery pack and the power controller;

a bypass channel positioned within the axle housing and coupling the inlet manifold to the outlet manifold; and a bypass valve configured to control flow through the bypass channel.

3. The electric drive axle of claim 2, wherein the power controller is configured to change a state of the bypass valve to permit flow from the outlet manifold to the inlet manifold through the bypass channel in response to a temperature of the battery pack falling below a battery operating temperature threshold.

4. The electric drive axle of claim 3, further comprising a pump within the axle housing and configured to induce flow through the bypass channel;

wherein the power controller is coupled to the pump and configured to activate the pump in response to the temperature of the battery pack falling below the battery operating temperature threshold.

5. The electric drive axle of claim 4, wherein the power controller is further configured to change the state of the bypass valve to prevent flow through the bypass channel and to deactivate the pump in response to the temperature of the battery pack rising above the battery operating temperature threshold.

6. The electric drive axle of claim 1, further comprising:

an inlet manifold positioned within the axle housing and coupled to the inlet and to the battery pack and the power controller;

an outlet manifold positioned within axle housing and coupled to the outlet and to the battery pack and the power controller;

a first valve positioned within the axle housing and configured to control flow from the inlet manifold to the battery pack; and a second valve positioned within the axle housing and configured to control flow from the inlet manifold to the power controller;

wherein the power controller is coupled to the first valve and the second valve and is further configured to control the first valve according to a temperature of the battery pack and to control the second valve according to a temperature of the power controller.

7. The electric drive axle of claim 1, wherein the plumbing lines are further configured to convey the coolant from the inlet to the wheel end units and from the wheel end units to the outlet.

8. The electric drive axle of claim 7, wherein each of the wheel end units defines an oil circulation path, the plumbing lines being configured to exchange heat with the oil circulation path.

9. The electric drive axle of claim 8, wherein each of the wheel end units includes a housing defining a coolant channel, the plumbing lines being coupled to the coolant channel.

10. The electric drive axle of claim 1, further comprising a heat exchanger external to the axle housing and coupled to the inlet and the outlet of the axle housing.

11. The electric drive axle of claim 10, further comprising a pump external to the axle housing, the pump configured to induce flow of the coolant through the heat exchanger and the plumbing lines.

12. The electric drive axle of claim 1, further comprising an inverter mounted within the axle housing, the power controller configured to control conversion of direct current (DC) current from the battery pack to alternating current supplied to the wheel end units.

13. The electric drive axle of claim 1, wherein the power controller is coupled to a direct current (DC) bus interface and is configured to charge the battery pack using current received over the DC bus interface.

14. The electric drive axle of claim 1, wherein a battery management system (BMS) is mounted within the axle housing for controlling charging and discharging of the battery pack.

15. The electric drive axle of claim 1, wherein the power controller is coupled to a data bus interface and is further configured to control operation of the wheel end units according to driver controls received over the data bus interface.

16. An electric drive axle for a work vehicle having a chassis supported off the ground by ground-engaging members, the electric drive axle comprising:

an axle housing configured to mount to the chassis, the axle housing defining an interior cavity disposed between opposite ends defining openings, the axle housing having an inlet and an outlet;

wheel end units secured at least partially within the axle housing, each wheel end unit defining a hub for engaging one of the ground-engaging members through one of the openings, each wheel end unit having an electric machine and a reduction ger set configured to rotate the hub of each wheel end unit;

a battery pack mounted within the axle housing between the wheel end units;

a power controller mounted within the axle housing between the wheel end units, the power controller electrically coupled to the wheel end units and the battery pack and configured to control supply of power from the battery pack to the wheel end units; and plumbing lines within the axle housing configured to convey a coolant from the inlet to the battery pack and the power controller and from the battery pack and the power controller to the outlet.

17. The electric drive axle of claim 16, further comprising:

an inlet manifold positioned within the axle housing and coupled to the inlet and to the battery pack and the power controller;

an outlet manifold positioned within the axle housing and coupled to the outlet and to the battery pack and the power controller;

a bypass channel positioned within the axle housing and coupling the inlet manifold to the outlet manifold; and a bypass valve configured to control flow through the bypass channel.

18. The electric drive axle of claim 17, wherein the power controller is configured to change a state of the bypass valve to permit flow from the outlet manifold to the inlet manifold through the bypass channel in response to a temperature of the battery pack falling below a battery operating temperature threshold.

19. The electric drive axle of claim 18, further comprising a pump within the axle housing and configured to induce flow through the bypass channel;

wherein the power controller is coupled to the pump and configured to activate the pump in response to the temperature of the battery pack falling below the battery operating temperature threshold.

20. The electric drive axle of claim 19, wherein the power controller is further configured to change the state of the bypass valve to prevent flow through the bypass channel and to deactivate the pump in response to the temperature of the battery pack rising above the battery operating temperature threshold.

* * * * *